US006637023B1

(12) United States Patent
Ginsberg (10) Patent No.: US 6,637,023 B1
(45) Date of Patent: Oct. 21, 2003

(54) METHOD AND SYSTEM FOR UPDATING READ-ONLY SOFTWARE MODULES

(75) Inventor: Michael Ginsberg, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/261,686

(22) Filed: Mar. 3, 1999

(51) Int. Cl.[7] ............................................ G06F 9/44
(52) U.S. Cl. ................... 717/122; 717/131; 717/169; 717/170; 711/102; 711/103; 711/104; 714/763; 714/764; 714/768
(58) Field of Search ............................... 711/102, 103, 711/104; 717/169–170, 131, 179, 122; 714/768, 763, 764

(56) References Cited

U.S. PATENT DOCUMENTS

| 4,542,453 A | * | 9/1985 | Patrick et al. ................. 714/8 |
| 5,367,658 A | * | 11/1994 | Spear et al. ................. 711/163 |
| 5,581,768 A | | 12/1996 | Garney et al. .............. 709/104 |
| 5,764,987 A | | 6/1998 | Eidt et al. ...................... 717/1 |
| 6,154,878 A | * | 11/2000 | Saboff ........................ 707/203 |

FOREIGN PATENT DOCUMENTS

| EP | 0810522 | 5/1997 | ........... G06F/9/445 |

OTHER PUBLICATIONS

IBM Technical Disclosure Bulletin, "Dual Indirect Ram/Rom JUMP Tables for Firmware Updates", vol. 31, No. 1, pp. 294–298, Jun. 1988.*
Sunaga et al., "A Reliable Communication Switching Platform for Quick Service Provisioning", IEEE, pp. 77–82, 1995.*
International Search Report—PCT/US 00/05641, Authorized Officer—Lucia Van Pinxteren, 6 Pages, (Sep. 22, 2000).

* cited by examiner

Primary Examiner—Gregory Morse
Assistant Examiner—Ted T. Vo
(74) Attorney, Agent, or Firm—Workman, Nydegger (57) ABSTRACT

A method and system are described for updating software modules bundled in a read-only device of a computer. According to the invention, when a software module is to be executed from the read-only device, the operating system identifies any other software modules stored within the read-only device on which the application depends. After identifying all of the dependencies, the operating determines whether a newer version of any of the identified software modules has been installed on the computer. The operating system copies into a read/write device a portion of the software module that references the old software modules. After copying the portion, the operating system modifies all references to point to the new versions of the software module. The invention allows software modules to be primarily executed from the read-only device with only a small updated portion being executed from a read/write device.

19 Claims, 5 Drawing Sheets

METHOD AND SYSTEM FOR UPDATING READ-ONLY SOFTWARE MODULES

TECHNICAL FIELD

This invention relates generally to the field of data processing and more particularly to a method and system for updating read-only software in a computing system.

BACKGROUND

Many conventional systems have mechanisms for executing software modules that are bundled in a read-only device such as a read-only memory (ROM). The software modules within the read-only device may be software applications, such as word processing software, or may be shared software libraries that are used by the applications during execution. For example, a read-only device may contain dynamically linked libraries (DLL's) that are shared by the software applications stored within the read-only device.

Speed and memory efficiencies can be achieved by executing the software applications and the libraries directly from the read-only device and not requiring that they be first loaded into random access memory (RAM). One problem with this approach is that in order to make even a small modification to one of the software modules the entire read-only device must be reprogrammed or replaced.

For these reasons, and for other reasons stated below which will become apparent to those skilled in the art upon reading and understanding the present specification, there is a need in the art for a mechanism by which read-only software modules can be updated without requiring that the read-only device be reprogrammed or replaced. Furthermore, there is a need for a mechanism by which read-only software modules can be updated dynamically at the time of execution.

SUMMARY

The invention provides a mechanism by which software modules executing from a read-only device may be updated to use newer versions of other software modules without requiring that the device be reprogrammed or replaced. The invention advantageously allows software modules to be primarily executed directly from the read-only device while only a small updated portion is executed from read/write device. The software modules may be stand-alone software applications or shared software libraries.

According to one aspect, the invention is a method of executing a software module on a computing system. A portion of the software module is loaded from a read-only device into a read/write device. The loaded portion of the software module is executed directly from the read/write device while a remainder of the software module is executed from the read-only device. In one embodiment virtual memory is allocated for both the portion of the software module loaded within the read/write device and for the remainder of the software module within the read-only device. The loaded portion of the software module is modified to correctly address the newer software modules. Much of the software module is executed directly from the read-only device while just the modified portion is executed from the read/write device.

According to another aspect, the invention is a computing system having a read-only device that contains a first portion of a software module. A read/write device contains a second portion of the software module. An operating system executes the software module by executing the first and second portions of the software module from their corresponding devices.

DETAILED DESCRIPTION

In the following detailed description of exemplary embodiments of the invention, reference is made to the accompanying drawings that form a part hereof and, which show by way of illustration, specific exemplary embodiments in which the invention may be practiced. These embodiments are described in sufficient detail to enable those skilled in the art to practice the invention. It is to be understood that other embodiments maybe utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. The first section describes the hardware and the operating environment that is suitable for use with the invention. The second section provides a detailed description of the embodiments of the inventive system. The third section provides methods for operating an exemplary embodiment of the invention. Finally, the fourth section provides a conclusion of the detailed description.

HARDWARE AND OPERATING ENVIRONMENT

Figure 1:
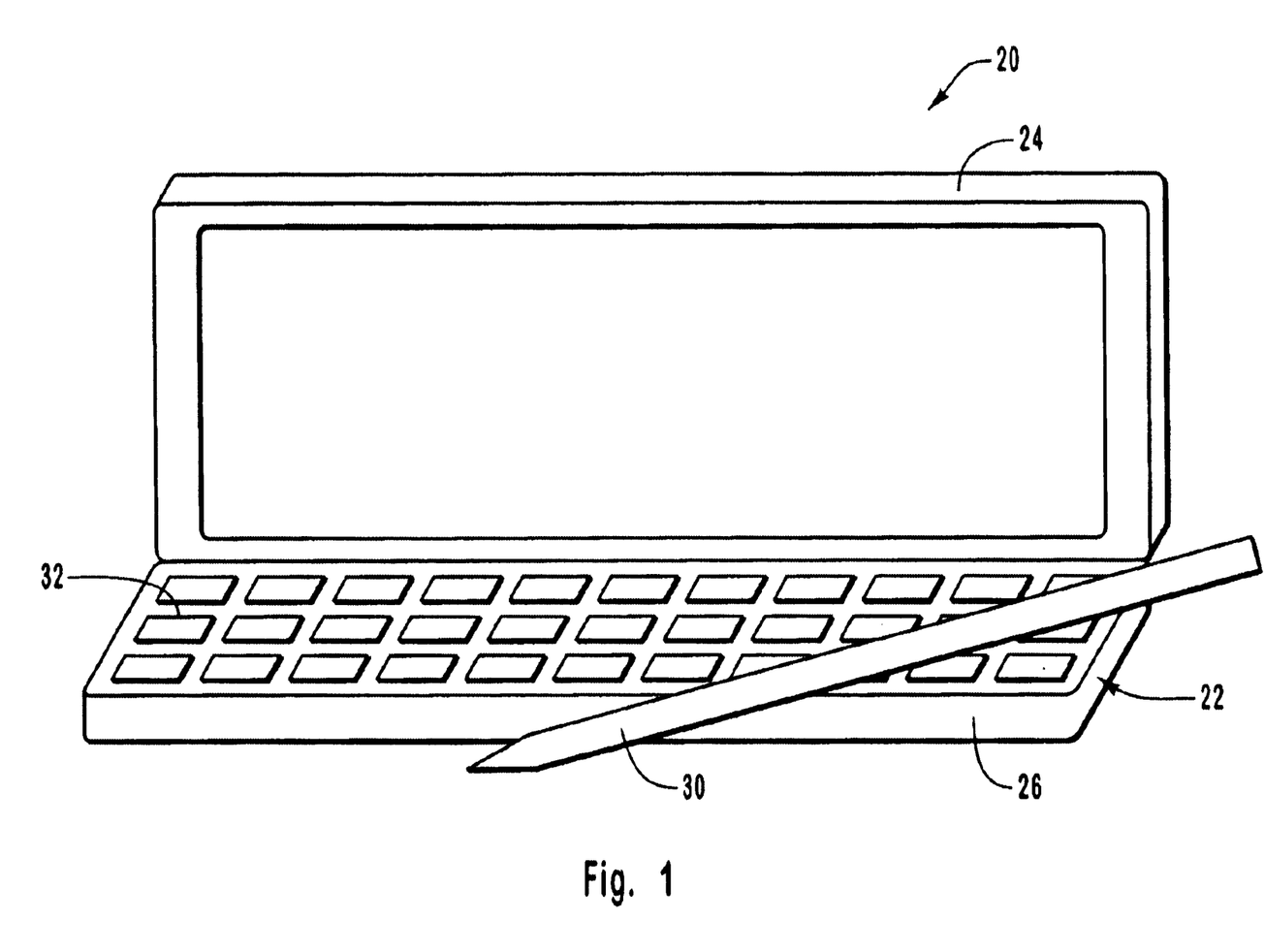
FIG. 1 is a diagram of the hardware and operating environment of a limited resource computer in conjunction with which embodiments of the invention may be practiced.

FIG. 1 is a diagram of resource-limited computer in which read-only applications are updated at run-time according to the various embodiments of the invention. The invention is described in the general context of computer-executable instructions, such as program modules, being executed by a computer, such as a personal computer. Generally, program modules include routines, programs, objects, components, data structures, etc., that perform particular tasks or implement particular abstract data types.

FIG. 1 illustrates a typical handheld personal computer (H/PC) 20 having limited computing resources. H/PC 20 has a casing 22 with a cover or lid 24 and a base 26. H/PC 20 has a liquid crystal display (LCD) 28 with a touch-sensitive screen mounted to the lid 24. The lid 24 is hinged to the base 26 so as to pivot between an open position, which exposes display 28, and a closed position, which protects the display. The H/PC 20 is equipped with a stylus 30 to enter data through the touch screen display 28 and a miniature keyboard 32. The stylus 30 and keyboard 32 are both mounted in base 26.

H/PC 20 can also be implemented with a wireless transceiver (not shown) such as an infrared transceiver and/or an radio frequency transceiver. Although the illustrated implementation shows a two-member H/PC 20 with a lid 24 and a base 26, other mechanical implementations of the H/PC might also be used.

Figure 2:
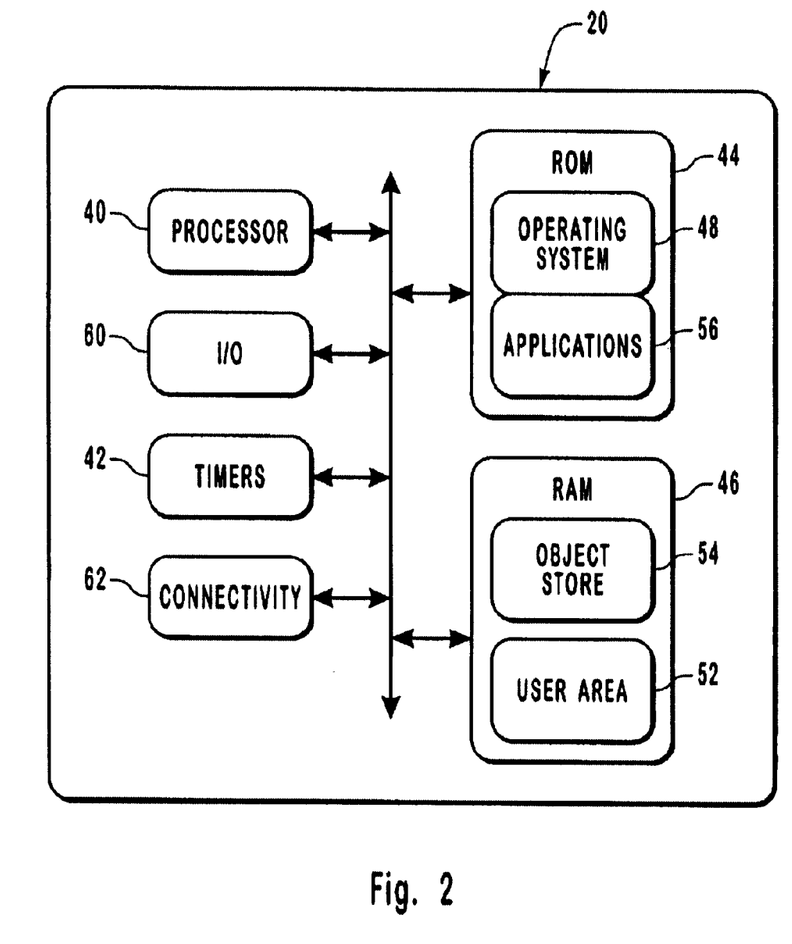
FIG. 2 is a block diagram showing functional components of the computer shown in FIG. 1.

FIG. 2 illustrates the primary functional components of the H/PC 20 shown in FIG. 1. The H/PC 20 includes microprocessor 40 that executes operating system 48. Processor 40 has three modes of operations: full-speed, standby and suspend. Full-speed mode is used to execute applications. Standby mode is used during brief idle periods. Suspend mode is used during long idle periods and uses less than one-thousandth of full speed power.

H/PC 20 includes timers 42 for providing interrupts and other timer events as well as the current date and time. Read-only memory (ROM) 44 stores operating system 48 as well as bundled applications 56. Random access memory (RAM) 46 includes user area 52 for executing user-installed applications and object store 54 for storing data. Object store 54 is used in place of conventional direct-access storage devices like disk and tape drives. In addition, object store 54 maintains a registry for H/PC 20. User input and output devices 60 communicate with external devices. Similarly, connectivity block 62 represents a number of standard connectivity devices such as a serial port, infrared communications hardware, etc.

The hardware and operating environment in conjunction with which embodiments of the invention may be practiced has been described. The following section provides a more detailed description of the embodiments of the inventive system.

SYSTEM LEVEL OVERVIEW

Figure 3:
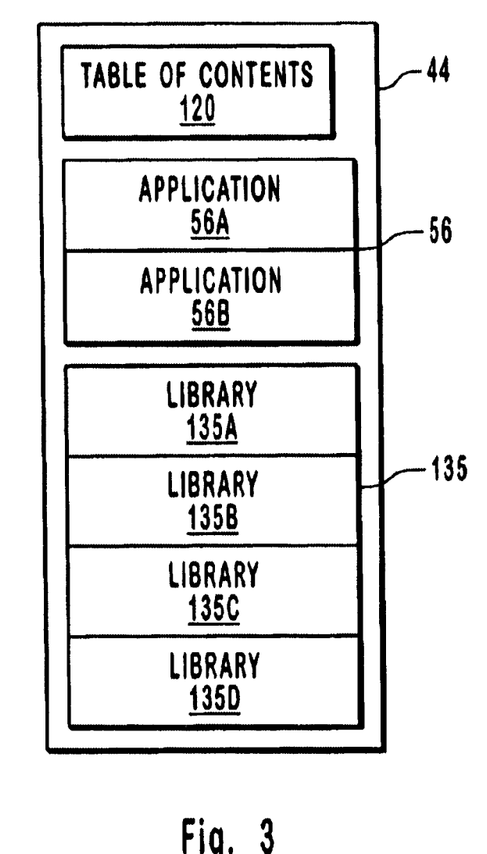
FIG. 3 is a block diagram illustrating one embodiment of a read-only device having executable software applications and shared libraries.

FIG. 3 illustrates one embodiment of a read-only memory (ROM) 44 having software applications 56 and shared libraries 135 stored therein. Read-only memory (ROM) 44 may be any memory-addressable device that is read-only or any device which only supports block writes such as flash memory, a flash memory card, etc.

Software applications 56 represent application programs, such as word processing software, that are stored in ROM 44 and which primarily execute from ROM 44 in order to increase initial execution speed and to conserve RAM 46. Libraries 135 are not stand-alone applications but are invoked by applications 56 or even by other libraries 135. For example, in one embodiment libraries 135 are dynamically linked libraries (DLL's). Within this application, the term software module includes both software applications 56 and libraries 135. Table of contents 120 lists all software applications 56 and libraries 135 stored within ROM 44 and provides a corresponding starting address for each software module.

As discussed above, in conventional resource-limited computing devices any change to libraries 135 often requires reprogramming or replacing the entire ROM 44. With consumer-oriented products, such as with palmtop and even laptop computers, this is especially problematic because it requires the user or a service technician to physically install a new ROM 44. A user cannot simply load a new version for one of the libraries 135 to hard disk drive 27 because all references to the replaced library 135 within ROM 44 will be unchanged and will incorrectly point to the old version. Thus, in conventional systems, users are forced to replace the entire read-only device, rewrite the entire device in the case of a flash memory device, or use the old versions of applications 56 and libraries 135.

In order to illustrate the invention, assume the user has installed a newer version of library 135D onto computer 20 and that software application 56A depends on library 135D. According to the invention, when software application 56A is to be executed, operating system 48 identifies libraries 135 on which the application 56 depends. After identifying all of the dependencies, operating system 48 determines whether a newer version of any of the identified libraries 135 has been installed on the computer 20. Thus, in this example operating system 48 determines that software application 56A depends on library 135D and that a newer version of library 135D has been loaded onto computer 20.

Because a new version of library 135D has been installed, operating system 48 updates application 56 and any other required libraries 135 that depend on library 135D such that they correctly reference the new library. More specifically, operating system 48 allocates one or more physical pages in RAM 46 and copies into RAM 46 a portion of application 56A that references library 135D. After copying the portion, operating system 48 modifies all references to point to the new version of library 135D. Operating system 48 repeats this process for each library 135 on which application 56A depends and that references the library 135D.

Next, operating system 48 executes software application 56A from both ROM 44 and RAM 46. In this manner, much of software application 56A is executed from ROM 44 while just the updated portion is executed from RAM 46. The updated libraries 135 are similarly executed. In this manner the invention facilitates updates to any of the libraries 135 contained within the ROM 44. If a new version for library 135D had not been installed then operating system 48 would have executed software application 56A directly from ROM 44 without modification.

Figure 4:
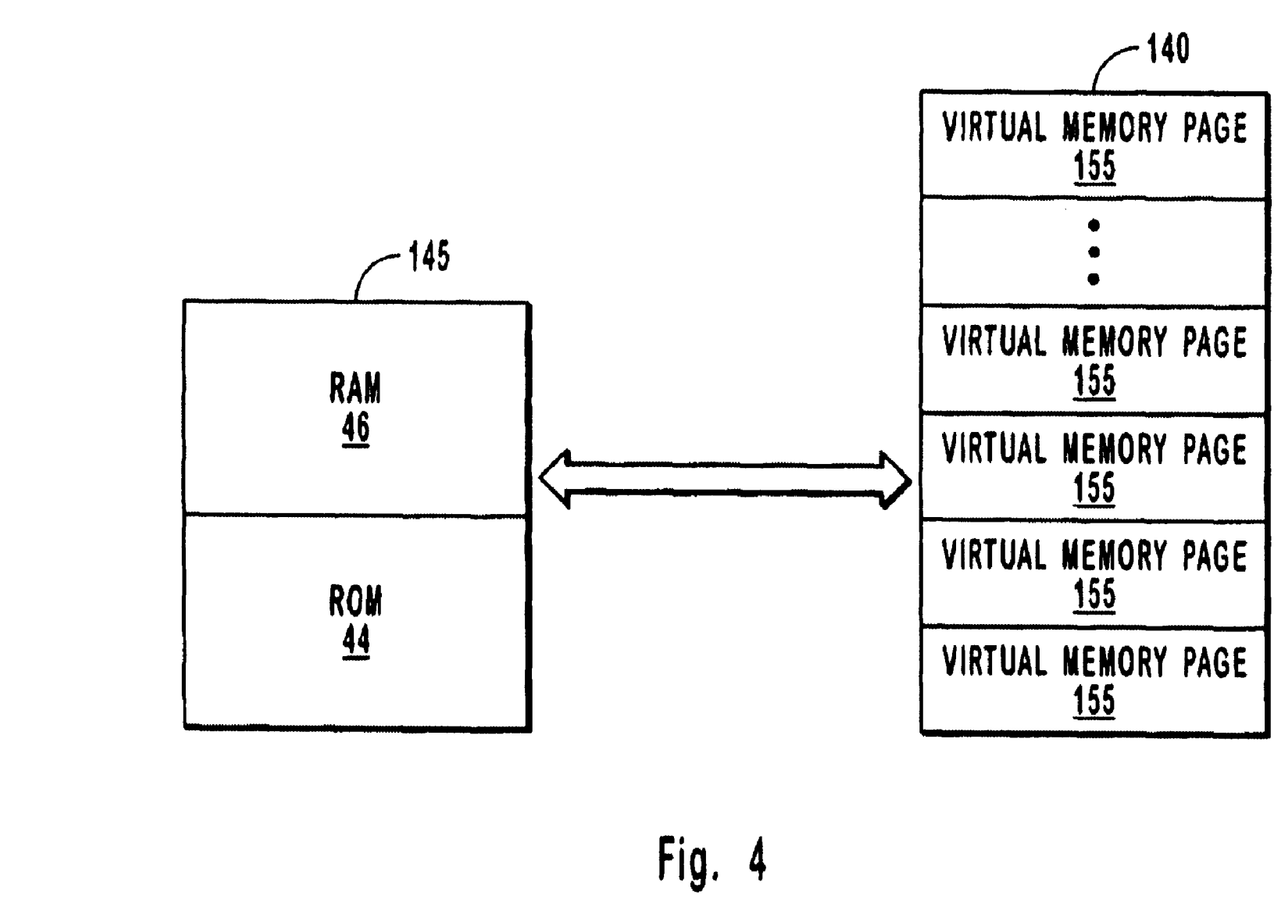
FIG. 4 is a block diagram that illustrates a mapping from virtual memory to physical memory that includes read-only memory (ROM) and random-access memory (RAM)

As illustrated in FIG. 4, in one embodiment operating system 48 includes a virtual memory (VM) system that maps virtual memory 140 to physical memory 145. More specifically, the VM system maps virtual memory pages 155 to physical pages located within either ROM 44 or RAM 46. In this embodiment, most of the virtual memory pages 155 that are allocated for executing applications 56 are mapped directly to the physical pages within the ROM 44. A small number of virtual memory pages 155, however, are allocated for the portions that have been modified in RAM 46. By using the VM system to map virtual memory pages to both ROM 44 and RAM 46, computer 20 can seamlessly execute applications 56 and libraries 135 with only initial modification to a small portion of the software.

METHOD OF AN EXEMPLARY EMBODIMENT OF THE INVENTION

In the previous section, a system level overview of the operation of exemplary embodiments of the invention was described. In this section, the particular methods performed by the exemplary embodiments are described by reference to a flowchart. The methods to be performed by the embodiments constitute computer programs made up of computer-executable instructions. Describing the methods by reference to a flowchart enables one skilled in the art to develop such programs including such instructions to carry out the methods on suitable computers from computer-readable media.

Figure 5:
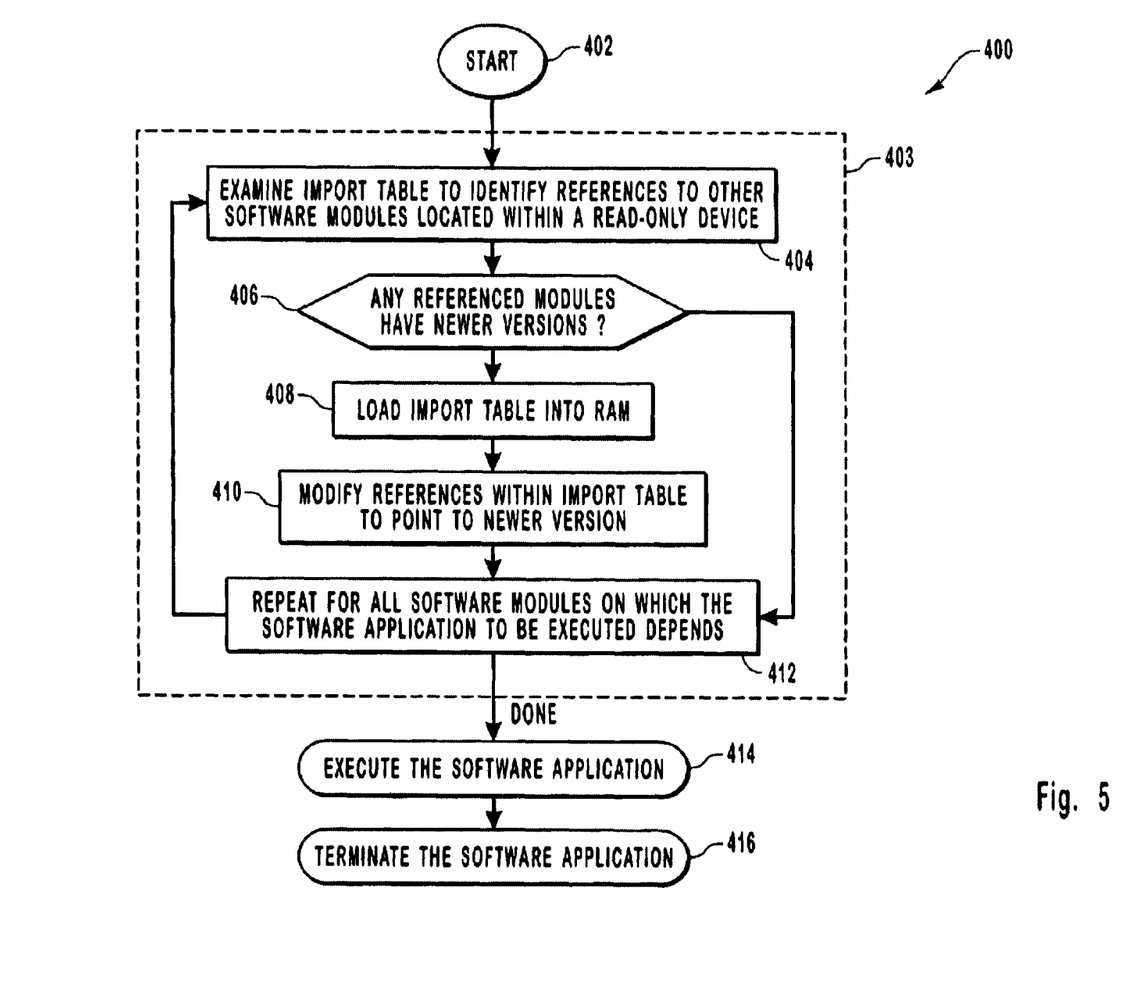
FIG. 5 is a flowchart illustrating one mode of operation in which the invention updates software modules stored in a read-only device without requiring that the contents of the read-only device be reprogrammed.

FIG. 5 is a flowchart 400 illustrating one exemplary method of operation of operating system 48 for updating at run-time software modules residing in ROM 44. Much of flowchart 400 is contained within loop 403 in which operating system 48 updates one of the software applications 56 that is to be executed and then repeats loop 403 for each required library 135.

Operating system 48 begins flowchart 400 with block 402 and enters loop 403 by proceeding to block 404. In block 404, operating system 48 identifies all libraries 135 that are necessary to execute the desired software application 56. In one embodiment each software application 56 and each library 135 contains an import table that lists all libraries 135 that are necessary for execution. An import table for a software module is an array of 32-bit pointers that identifies all necessary imports for a software module. The last entry is set to zero (NULL) to indicate end of the table. For example, the import table for software application 56A may identify libraries 135A, 135B and 135C as necessary for execution.

In block 406 operating system 48 determines whether a new version has been installed for any of the identified libraries 135. In order to determine whether a new version exists, the operating system 48 follows a predefined search path while looking for files having identical names to required libraries 135. For example, operating system 48 examines the root directory for any mounted volumes, the root directory for the built-in volume of H/PC 20 and an operating system specific directory. Any file found by operating system 48 that has the identical name as one of the required libraries 135 is presumed to be a newer version.

If no newer versions have been installed, operating system 48 jumps to block 412 and repeats loop 403 for each library 135 that is necessary for execution of the software application 56A. If a new version has been installed for one or more of the necessary libraries 135 then operating system 48 proceeds from block 406 to block 408.

In block 408 operating system 48 allocates one or more physical pages within RAM 46 and loads a portion of the software application 56 into the allocated pages. More specifically, operating system 48 loads the physical pages from ROM 44 to RAM 46 that contain the references to the replaced library 135. For example, in one embodiment operating system 46 loads the import table, or a portion thereof, into RAM 46.

In block 410, operating system 48 modifies the portion of application 135 that has been loaded into RAM 46. Operating system 48 updates the RAM-based portion such that any reference to a replaced library 135 now points to the new version. In one embodiment, operating system 48 modifies the import table that has been copied to RAM 46.

After updating RAM-based portion, operating system 46 proceeds to block 412 and repeats loop 403 for each library 135 necessary to execute the desired software application 56. When all of the dependencies have been examined and all libraries 135 have been updated if necessary, operating system 48 exits loop 403 and proceeds to block 414.

In block 414 operating system 48 executes application 56. In order to execute an application, operating system 56 allocates a set of virtual memory pages 155 that map to the physical memory pages consumed by the application 56 and any necessary libraries 135. If portions of application 56 and the necessary shared modules 135 have been copied to RAM 46, operating systems 56 instructs the VM system to map the virtual memory pages 155 to the updated portions. Once virtual memory 140 has been allocated for the ROM-based portions and the RAM-based portions, computer 20 seamlessly executes software application 56.

After software application 56 has completed execution, operating system 48 proceeds to block 416, deallocates virtual memory pages 155 and removes all portions of software application 56 and libraries 135 that have been copied to RAM 46.

CONCLUSION

Various embodiments for updating software modules stored in a read-only device of a computer have been described. The invention provides a mechanism by which a user can install newer versions of software modules that are used by ROM-based software modules without requiring that the user install a new ROM. The invention advantageously allows software modules to be primarily executed from the read-only device while only a small portion is updated and executed from a read/write device. The software modules may be stand-alone software applications or shared software libraries.

Although specific embodiments have been illustrated and described herein, it will be appreciated by those of ordinary skill in the art that any arrangement which is calculated to achieve the same purpose may be substituted for the specific embodiments shown. Therefore, this application is intended to cover any adaptations or variations of the present invention.

We claim:

1. In a computing system having an operating system, a random access memory and a read-only memory, a method for dynamically updating a software application at run-time that is stored in and executed from the read-only memory, utilizing one or more libraries stored in the random access memory at the time the software application is to be executed, and without having to replace the entire software application stored in the read-only memory, the method comprising:

at run-time, when the software application is to be executed, identifying, by the operating system, all libraries that are required for execution of the software application;

upon identifying all libraries required for execution, determining, by the operating system, that a new version of one or more of the required libraries has been installed on the computing system;

before executing the software application and upon determining that the new version of the one or more required libraries has been installed onto the computing system, copying from the read-only memory into the random access memory only portions of the software application that references the one or more required libraries for which the new version has been installed;

before executing the software application, modifying the copied portions of the software application, such that all references of the copied portions will to the new version of the one or more required libraries; and after modifying the copied portion of the software application, executing only the copied portions of the software application from the random access memory, and executing the uncopied portions of the software application from the random access memory.

2. The method of claim 1, wherein executing the copied and uncopied portions of the software application include allocating virtual memory for the copied portions of the software application on the random access memory and for the uncopied portions of the software application on the read-only memory.

3. The method of claim 1, wherein copying portions of the software application includes copying at least one physical memory page from the read-only memory to a physical memory page of the random access memory.

4. The method of claim 1, wherein copying portions of the software application includes:

identifying said all references that point to the one or more required libraries in the read-only memory; and copying the indentified references to the random access memory.

5. The method of claim 4, wherein identifying said all references that point to the required libraries in the read-only memory includes examining an import table for the software application, wherein the import table lists the required libraries.

6. The method of claim 5, wherein identifying said all references further includes examining an import table for the required libraries listed by the import table of the software application.

7. The method of claim 1, wherein the one or more required libraries includes a dynamically linked library.

8. The method of claim 1, wherein the act of executing the copied portions of the software application comprises the act of executing the new version of the one or more required libraries from the random access memory.

9. The method of claim 8, wherein the act of executing the uncopied portions of the software application comprises the act of executing another library from the read-only memory, wherein no new version of the other library has been loaded onto the computing system.

10. The method of claim 1, further comprising the act of updating the software application by loading the new version of the one or more required libraries into the random access memory.

11. A computer-readable medium having computer-executable instructions to cause a computing system having an operating system, a random access memory and a read-only memory on which a software application and one more libraries are stored, to perform a method for dynamically updating the software application at run-time, utilizing one or more libraries stored in the random access memory at the time the software application is to be executed, and without having to replace the entire software application stored in the read-only memory, the method comprising:

at run-time, when the software application is to be executed, identifying, by the operating system, all libraries required for execution of the software application;

upon identifying all libraries required for execution, determining, by the operating system, that a new version of one or more libraries has been installed onto the computing system;

before executing the software application and upon determining that the new version of the particular library has been installed, copying from the read-only memory into the random access memory only portions of the software application that references the one or more required libraries for which the new version has been installed;

before executing the software application, modifying the copied portions of the software application, such that all references of the copied portions will point to each corresponding new version of the one or more required libraries; and after modifying the copied portions of the software application, executing only the copied portions of the software application from the random access memory, and executing the uncopied portions of the software application from the read-only memory.

12. The computer-readable medium of claim 11, wherein, in order to cause the computing system to execute the copied portions of the software application from the random access memory, the computer-executable instructions further cause the computing system to execute the new version of the one or more libraries from the random access memory.

13. The computer-readable medium of claim 12, wherein, in order to cause the computing system to execute the uncopied portions of the software application, the computer-executable instructions further cause the computing system to execute another library from the read-only memory, wherein no new version of the other library has been loaded onto the computing system.

14. The computer-readable medium of claim 11, wherein the method further comprises updating the software application by loading the new version of the one or more required libraries into the random access memory.

15. A computing system comprising:

a read-only memory on which a software application and libraries are stored;

a random access memory; and an operating system that is capable of:

at run-time, when the software application is to be executed, identifying all of the libraries required for execution of the software application;

upon identifying all of the required libraries and before executing the software application, determining that a new version of one or more of the required libraries has been installed onto the computing system;

before executing the software application and upon determining that the new version of one or more of the required libraries has installed, copying from the read-only memory into the random access memory only those portions of the software application that references the one or more required libraries for which the new version has been installed;

before executing the software application, modifying the copied portions of the software application, such that all references of the copied portions will point to each corresponding new version of the one or more required libraries; and after modifying the copied portion of the software application, executing only the copied portions of the software application from the random access memory, and executing the uncopied portions of the software application from the read-only memory.

16. The computing system of claim 15, wherein the operating system, in order to execute the copied and uncopied portions of the software application, includes a virtual memory system to allocate virtual memory for the copied portions of the software application on the random access memory and for the uncopied portions of the software application on the read-only memory.

17. The computing system of claim 15, wherein, in order to copy from the read-only memory onto the random access memory portions of the software application that references the one or more required libraries, the operating system is further capable of copying at least one physical memory page from the read-only memory to a physical memory page of the random access memory.

18. The computing system of claim 15, wherein, in order to copy from the read-only memory onto the random access memory the portions of the software application that references the required libraries, the operating system is further capable of:

identifying said all references that point to the required libraries in the read-only memory; and copying the indentified references to the random access memory.

19. The computing system of claim 18, wherein the operating system, in order to identify said all references, is further capable of examining an import table for the software application, wherein the import table lists the required libraries.

* * * * *

UNITED STATES PATENT AND TRADEMARK OFFICE
CERTIFICATE OF CORRECTION

PATENT NO. : 6,637,023 B1
DATED : October 21, 2003
INVENTOR(S) : Michael Ginsberg It is certified that error appears in the above-identified patent and that said Letters Patent is hereby corrected as shown below:

Title page,
Item [57], ABSTRACT,
Line 7, after "operating" please insert -- system --

Column 3,
Line 2, after "and/or" please delete "an" and insert -- a --
Line 15, after "providing" please delete "interrupts" and insert -- interruptions --

Column 6,
Line 40, after "that" please delete "references" and insert -- reference --

Column 7,
Line 45, after "that" please delete "references" and insert -- reference --

Column 8,
Line 23, after "has" please insert -- been --
Line 26, before "the one" please delete "references" and insert -- reference --
Line 47, after "that" please delete "reference"s and insert -- reference --
Lines 54-55, after "that" please delete "references" and insert -- reference --

Signed and Sealed this

Thirty-first Day of August, 2004

JON W. DUDAS
*Director of the United States Patent and Trademark Office*